(12) United States Patent
Enomoto et al.

(10) Patent No.: US 10,217,578 B2
(45) Date of Patent: Feb. 26, 2019

(54) KEYBOARD

(71) Applicant: TOPRE CORPORATION, Tokyo (JP)

(72) Inventors: Kazufumi Enomoto, Kanagawa (JP);
Kenki Enomoto, Kanagawa (JP)

(73) Assignee: TOPRE CORPORATION, Tokyo (JP)

( * ) Notice: Subject to any disclaimer, the term of this patent is extended or adjusted under 35 U.S.C. 154(b) by 0 days.

(21) Appl. No.: 15/555,453

(22) PCT Filed: Feb. 25, 2016

(86) PCT No.: PCT/JP2016/056516
§ 371 (c)(1),
(2) Date: Sep. 1, 2017

(87) PCT Pub. No.: WO2016/140291
PCT Pub. Date: Sep. 9, 2016

(65) Prior Publication Data
US 2018/0040440 A1 Feb. 8, 2018

(30) Foreign Application Priority Data
Mar. 4, 2015 (JP) .................................. 2015-042137

(51) Int. Cl.
*H01H 13/83* (2006.01)
*H01H 13/02* (2006.01)
(Continued)

(52) U.S. Cl.
CPC ............ *H01H 13/83* (2013.01); *H01H 13/02* (2013.01); *H01H 13/023* (2013.01);
(Continued)

(58) Field of Classification Search
CPC ............ H01H 2219/062; H01H 13/83; H01H 13/023; H01H 2219/06; H01H 2219/056;
(Continued)

(56) References Cited

U.S. PATENT DOCUMENTS

2002/0056626 A1* 5/2002 Ito .......................... H01H 13/70
200/293
2002/0144884 A1 10/2002 Kurihara
(Continued)

FOREIGN PATENT DOCUMENTS

DE     102005015814    10/2006
EP         0342747     11/1989
(Continued)

OTHER PUBLICATIONS

International Patent Application No. PCT/JP2016/056516, International Search Report dated Jun. 28, 2016 and English translation, 5 pages (3 pages original notice, 2 pages English translation).
(Continued)

*Primary Examiner* — Ahmed M Saeed
(74) *Attorney, Agent, or Firm* — Kilpatrick Townsend & Stockton LLP

(57) ABSTRACT

In a keyboard, a keybutton opposes an operation detection portion. A light source is provided on an outer side of the operation detection portion. A light guide member guides light from the light source to a keytop of the keybutton. The light guide member includes an incident portion opposing the light source, an emitting portion opposing the keytop, and a guide portion which guides the light incident from the incident portion to the emitting portion. An incident surface of the incident portion is formed in a shape of a curved surface that protrudes to the light source side.

10 Claims, 9 Drawing Sheets

(51) Int. Cl.
*H01H 13/70* (2006.01)
*F21V 8/00* (2006.01)
*H01H 9/18* (2006.01)

(52) U.S. Cl.
CPC ........... *H01H 13/70* (2013.01); *G02B 6/0016* (2013.01); *H01H 9/182* (2013.01)

(58) Field of Classification Search
CPC ............. H01H 13/14; H01H 2219/036; H01H 2221/07; H01H 9/161; H01H 9/182
USPC ......... 200/310–317, 5 A, 341–345; 362/615, 362/611, 612, 613, 623, 600, 608
See application file for complete search history.

(56) References Cited

U.S. PATENT DOCUMENTS

| | | |
|---|---|---|
| 2011/0305026 A1 | 12/2011 | Mochizuki |
| 2015/0191933 A1 | 7/2015 | Stetter et al. |

FOREIGN PATENT DOCUMENTS

| | | |
|---|---|---|
| JP | S56-154722 | 11/1981 |
| JP | H04-018884 | 2/1992 |
| JP | H04-046329 | 4/1992 |
| JP | H06-242729 A | 9/1994 |
| JP | 2001-216070 A | 8/2001 |
| JP | 2002-289058 | 10/2002 |
| JP | 2012003845 | 1/2012 |
| JP | 2015-038891 A | 2/2015 |
| KR | 20130122811 | 11/2013 |
| WO | 2013190004 | 12/2013 |

OTHER PUBLICATIONS

International Patent Application No. PCT/JP2016/056516, Written Opinion dated Jun. 28, 2016, 11 pages (5 pages original notice, 6 pages English translation).
Korean Patent Application No. 10-2017-7024602, Office Action with English translation, dated May 18, 2018, 10 pages.
EP16758984.5, "Extended European Search Report", dated Sep. 20, 2018, 10 pages.

* cited by examiner

KEYBOARD

CROSS REFERENCE TO RELATED APPLICATIONS

This application is a U.S. National Stage of PCT International Application No. PCT/JP2016/056516, filed on Feb. 25, 2016, entitled "Keyboard," which claims priority to JP Application No. 2015-042137, filed on Mar. 4, 2015, entitled "Keyboard," which are hereby incorporated by reference in their entireties.

TECHNICAL FIELD

The present invention relates to a keyboard.

BACKGROUND ART

A keyboard which is used as an input device of a personal computer or the like may be used at a dark place. It is required that a keyboard can allow an operator to know a position of a keybutton even in a case where the keyboard is used at a dark place.

Patent Literature 1 discloses a keyboard which guides light from a light source provided on a substrate to a keytop by a prism (light guide member) provided on the inside of the keybutton and illuminates the keytop.

PRIOR ART

Patent Literature

Patent Literature 1: JP-A-06-242729

SUMMARY OF INVENTION

Technical Problem

In Patent Literature 1, the light incident from an incident end portion of the prism advances while being reflected on the inside of the prism, and then, is emitted toward the keytop from an emitting end portion of the prism, and accordingly, the keytop is illuminated.

However, since the prism cannot totally reflect the entire incident light, there is a case where the incident light leaks from a place other than the emitting end portion.

Therefore, there is a case where a quantity of light that illuminates the keytop is not sufficient and visibility is not sufficient. It is required to further improve the visibility of the keybutton.

Solution to Problem

According to the present invention, in a keyboard which includes a housing which supports a keybutton to be capable of reciprocating in an operating direction of the keybutton, and a substrate on which an operation detection portion of the keybutton is provided, the keybutton supported by the housing is disposed to oppose the operation detection portion on an axial line along the operating direction of the keybutton, in which a light source is provided further on an outer side than the operation detection portion on the substrate when viewed from the axial direction of the axial line, a light guide member which guides light, from the light source, to a keytop of the keybutton is formed of a material having a refractive index which is higher than that of the air and is provided in the housing, the light guide member includes an incident portion disposed to oppose the light source in the axial direction of the axial line, an emitting portion disposed to oppose the keytop at a position hidden by the keybutton when viewed from the axial direction of the axial line, and a guide portion which guides the light from the light source incident from the incident portion to the emitting portion while reflecting the light, and a surface which opposes the light source of the incident portion is formed in a shape of a curved surface that protrudes to the light source side.

Advantageous Effects of Invention

According to the present invention, since the refractive index of the light guide member is greater than the refractive index of the air, the light which is radiated from the light source and has reached the incident portion is refracted without being reflected on a front surface of the incident portion, and enters the inside of the light guide member from the incident portion. When a surface that opposes the light source of the incident portion is formed in a shape of a curved surface that protrudes to a side of the light source and a surface area of the incident portion increases, the quantity of the light, from the light source, incident from the incident portion increases, and as a result, it is possible to ensure the quantity of the light radiated from the emitting portion toward the keytop.

Accordingly, since it is possible to prevent a case where the quantity of light which illuminates the keytop is not sufficient and the visibility is not sufficient, it is possible to provide a keyboard that can be used even at a dark place and has excellent visibility.

DESCRIPTION OF EMBODIMENTS

Hereinafter, embodiments of the present invention will be described.

Figure 1A:
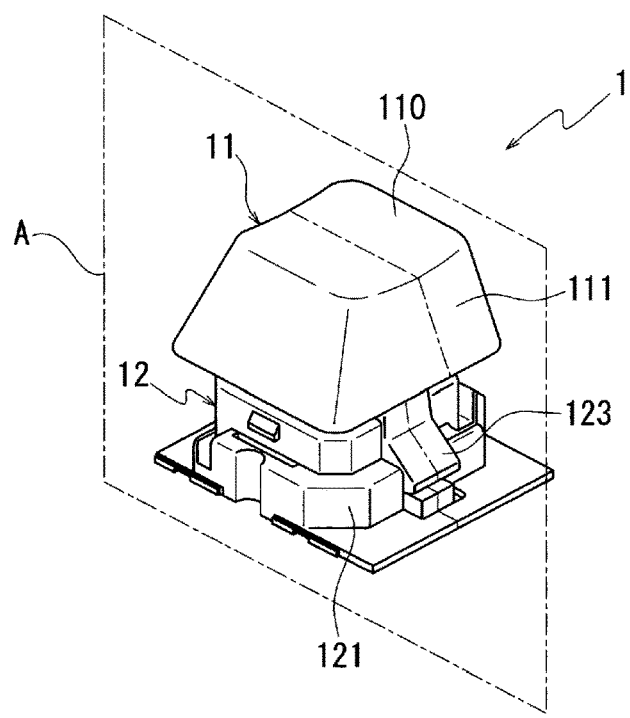
FIGS. 1(a) and 1(b) describe a key that configures a keyboard.
Figure 1B:
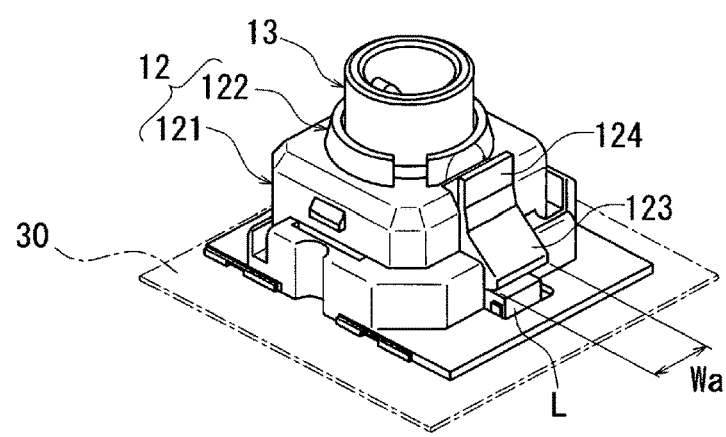

FIGS. 1(a) and 1(b) describe a key 1 which configures a keyboard, FIG. 1(a) is a perspective view of the key 1, and FIG. 1(b) is a perspective view illustrating a state where a keybutton 11 is detached from the key 1 illustrated in FIG. 1(a), and is a view illustrating a housing 12 and a plunger 13 which is supported by a support portion 122 of the housing.

Figure 2:
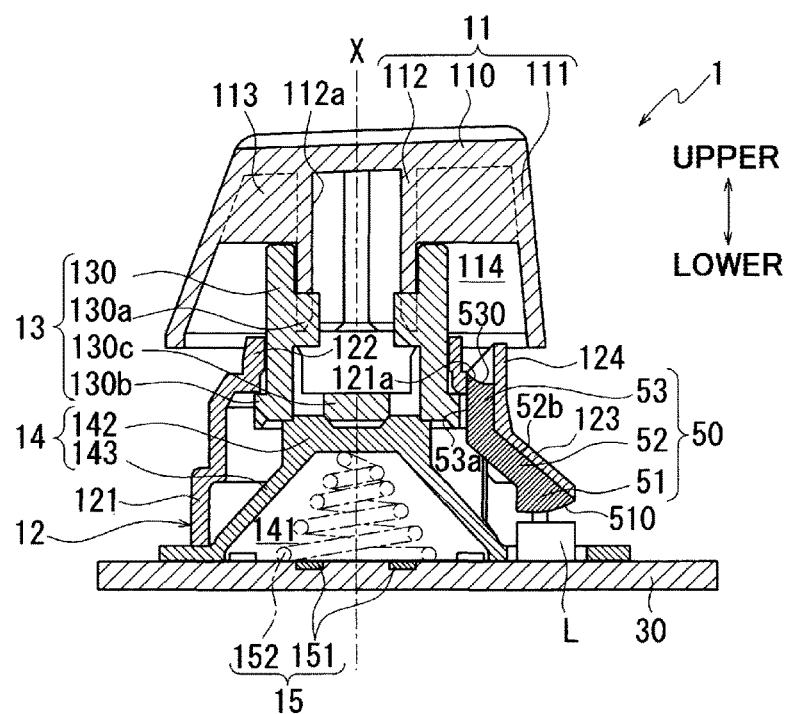
FIG. 2 is a sectional view of the key.

FIG. 2 is a view describing a specific configuration of the key 1, and is a sectional view obtained by cutting the key 1 by a surface A in FIG. 1(a). In addition, in the following description, for convenience, the keybutton 11 side in FIG. 2 is an upper side and a substrate 30 side is a lower side.

As illustrated in FIG. 1(a), the key 1 includes the keybutton 11 and the housing 12. The keybutton 11 moves to a lower part on the housing 12 side by a pressing operation of a keytop 110 of which an upper surface is concaved in a recessed shape, and the keybutton 11 in the housing 12 is provided to be capable of reciprocating in the operating direction (upward-and-downward direction in FIG. 2) of the keybutton 11.

As illustrated in FIG. 2, the keybutton 11 includes the keytop 110, a circumferential wall portion 111 that surrounds an outer circumferential edge of the keytop 110 across the entire circumference, and a columnar shaft portion 112 which extends from the lower surface of the keytop 110 to the lower part on the substrate 30 side.

The shaft portion 112 is provided substantially at the center of the keytop 110, and on the lower side of the keytop 110, between the outer circumference of the shaft portion 112 and the inner circumference of the circumferential wall portion 111, a space portion 114 into which the support portion 122 of the housing 12 which will be described later can enter is formed.

On the lower surface of the keytop 110, a reinforcing wall 113 is provided by connecting the keytop 110, the shaft portion 112, and the circumferential wall portion 111 to each other, and rigidity and strength of the keybutton 11 are ensured by the reinforcing wall 113.

On the upper surface of the keytop 110, characters, drawings, or symbols which write functions assigned to the keybutton 11, are printed, and in the keytop 110, only a part at which the characters, the drawings, or the symbols are printed transmits the light.

Therefore, when the lower surface of the keytop 110 is illuminated by a light source L which will be described later, the characters, the drawings, or the symbols which are printed on the keytop 110 are displayed (illuminated) to be visually recognizable by an operator.

In the embodiment, the keytop 110 is formed of a translucence resin, and at least the front surface on the outer side is coated with a coating material that does not transmit the light. In the keytop 110, the above-described characters, the drawings, or the symbols are printed by removing the coating using laser or the like, and when a rear surface of the keytop 110 is illuminated, the symbols or the like shine to be visually recognizable by the light that has transmitted the printed part.

A cylindrical base portion 130 of the plunger 13 is attached to a lower end side of the shaft portion 112 as an exterior.

On the inner side of the base portion 130, a rib 130a which makes a shape of a cross when viewed from the axial direction of the axial line X is provided, and on a lower end side of the base portion 130, a flange portion 130b having a greater outer diameter than that of the base portion 130 is provided.

The plunger 13 penetrates the cylindrical support portion 122 provided in the housing 12 from a lower part on the substrate 30 side, and as the upper end of the base portion 130 of the plunger 13 is externally fitted to the shaft portion 112 on the outer side of the support portion 122, the plunger 13 and the keybutton 11 are linked to each other.

In this state, as the rib 130a on the base portion 130 side and a groove 112a provided in the shaft portion 112 are engaged with each other, the keybutton 11 and the plunger 13 are linked to each other in a state where a relative rotation is regulated.

Furthermore, the plunger 13 and the keybutton 11 are inhibited from falling out of the housing 12 (support portion 122) by the flange portion 130b provided in the base portion 130.

In addition, in this state, the keybutton 11 is provided to be capable of reciprocating in the axial line X direction in the housing 12 (support portion 122) via the plunger 13.

In the embodiment, when viewed from the operating direction (axial direction of the axial line X) of the keybutton 11, the keybutton 11 has a size that covers the housing 12, and in a finished product of the keyboard, the housing 12 is hidden by the keybutton 11 and cannot be visually recognized.

The housing 12 includes an accommodation portion 121 which accommodates the operation detection portion 15 which detects the operation of the keybutton 11, the cylindrical support portion 122 which supports the keybutton 11 to be capable of reciprocating above the operation detection portion 15, a light shielding wall portion 123 in which a light guide member 50 which will be described later is fixed to the inner side surface, and an inhibition wall portion 124 which extends upward from an upper end of the light shielding wall portion 123.

The operation detection portion 15 accommodated in the accommodation portion 121 includes a pair of electrodes 151 and 151 which are disposed having an interval on an upper surface of the substrate 30, and an elastic body 152 (conical coil spring or the like) loaded across the pair of electrodes 151 and 151, and a loading portion 142 of a cup rubber 14 loaded on the substrate 30 is loaded on the elastic body 152.

The cup rubber 14 has a trapezoidal shape, and an inner side of the cup rubber 14 becomes a cavity portion 141 which accommodates the operation detection portion 15.

The cup rubber 14 is formed of an elastic member, such as rubber, and a pressing portion 130c of the plunger 13 assembled to the keybutton 11 is loaded on the loading portion 142 that makes a columnar shape.

As described above, when the keybutton 11 is pressed and operated, the plunger 13 moves to the substrate 30 side being integrated with the keybutton 11. Therefore, when the keybutton 11 is operated, the loading portion 142 pressed by the plunger 13 is displaced to the substrate 30 side while bending a leg portion 143, the elastic body 152 is displaced to the substrate 30 side, and accordingly, a change in electrostatic capacity is sensed, and the pressing operation of the keybutton 11 is sensed.

In the substrate 30, the light source L is provided on the outer side of the operation detection portion 15, and an incident portion 51 of the light guide member 50 is positioned above the light source L.

In the embodiment, as the light source L, for example, a light emitting diode is employed, and the light emitting diode used in this case may be a monochrome light emitting diode or may be a combination of plural colors of light emitting diodes.

In addition, in a case of using the light emitting diode as the light source L, in order to widen an incident area of the light to the light guide member 50, it is preferable to provide a diffusion member which diffuses the light to a light radiation portion of the light emitting diode.

Figure 3:
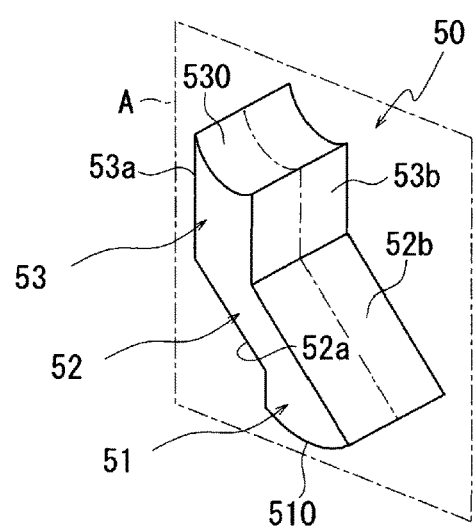
FIG. 3 is a perspective view of a light guide member.

FIG. 3 is a perspective view of the light guide member 50 provided in the housing 12.

Figure 4:
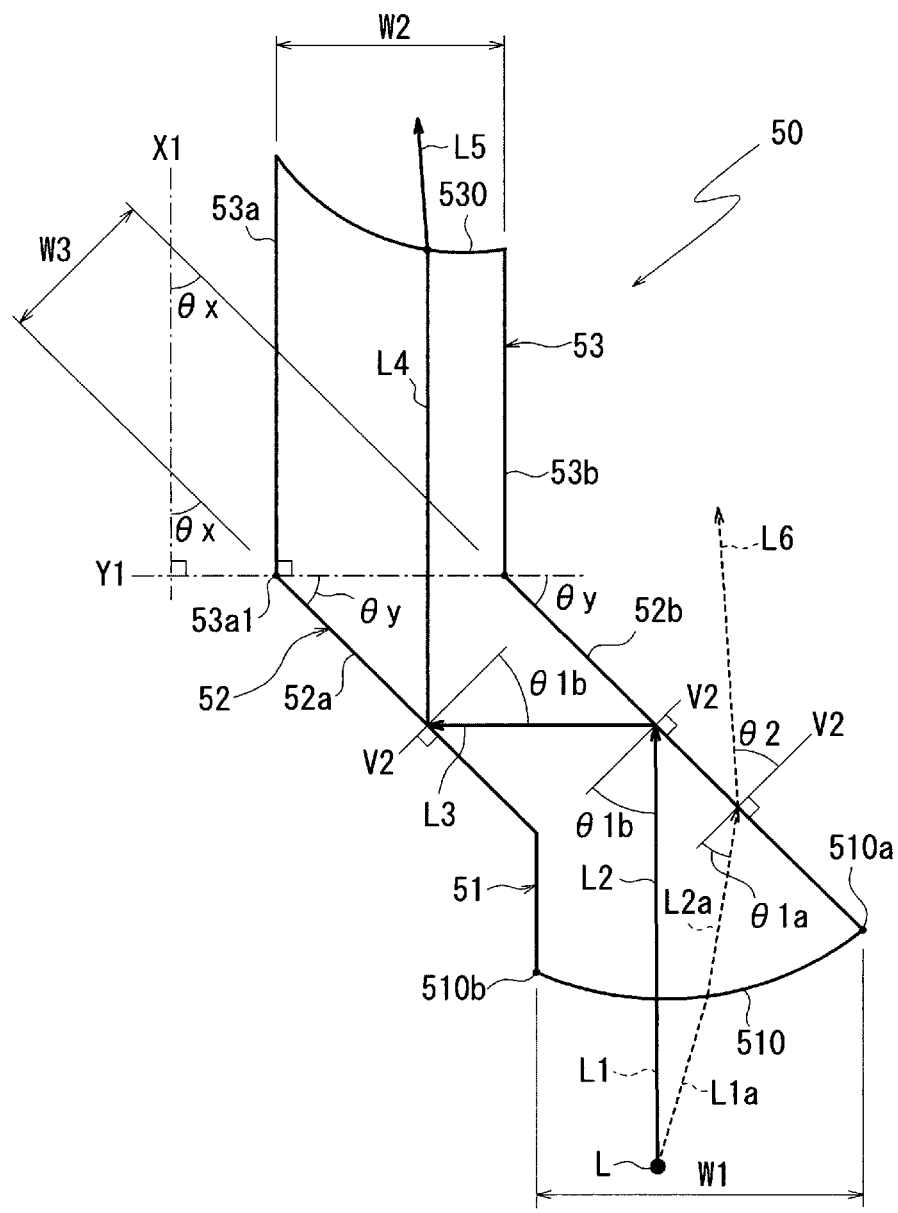
FIG. 4 is a view describing a movement track of light in the light guide member.
Figure 5:
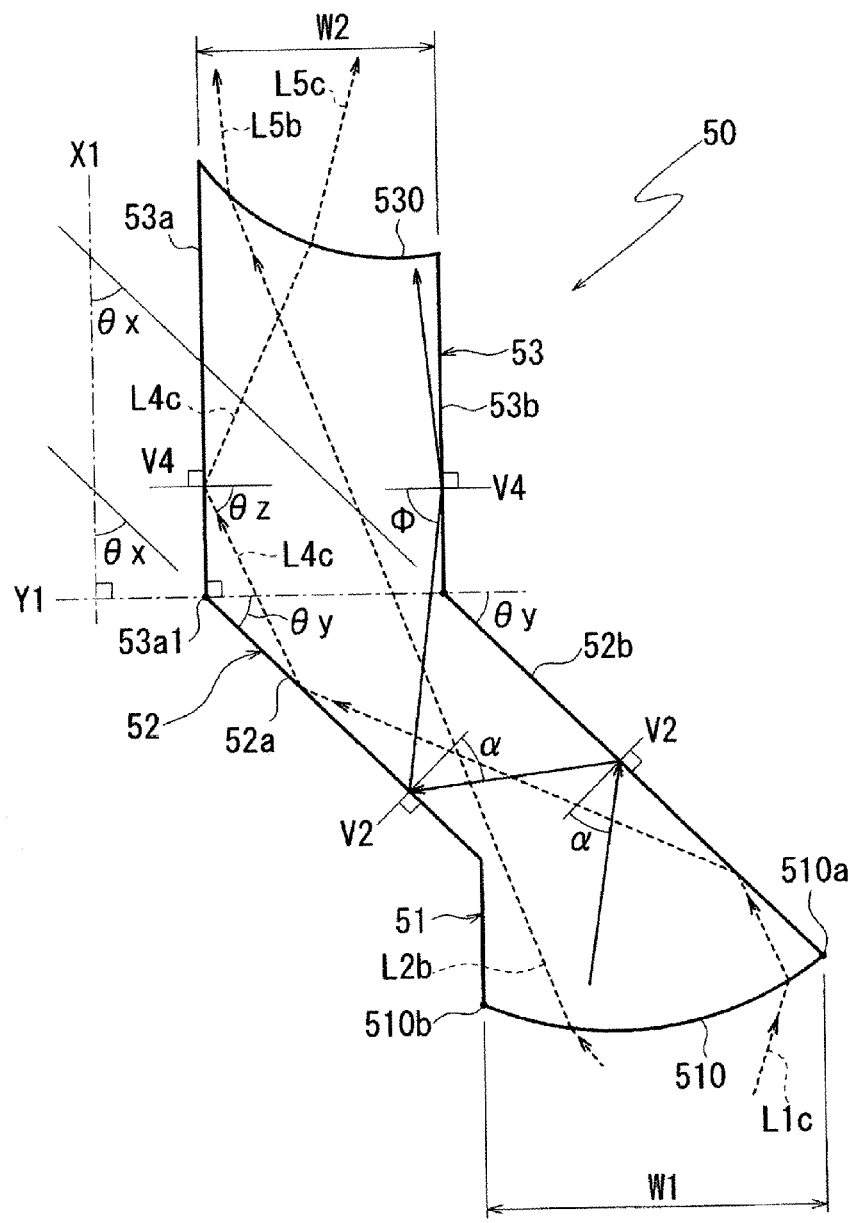
FIG. 5 is a view describing the movement track of the light in the light guide member.

FIGS. 4 and 5 are views describing the light guide member 50, views schematically illustrating a section obtained by cutting the light guide member 50 by a surface A in FIG. 3, and views describing a movement track or the like of the light incident on the light guide member 50.

Figure 6A:
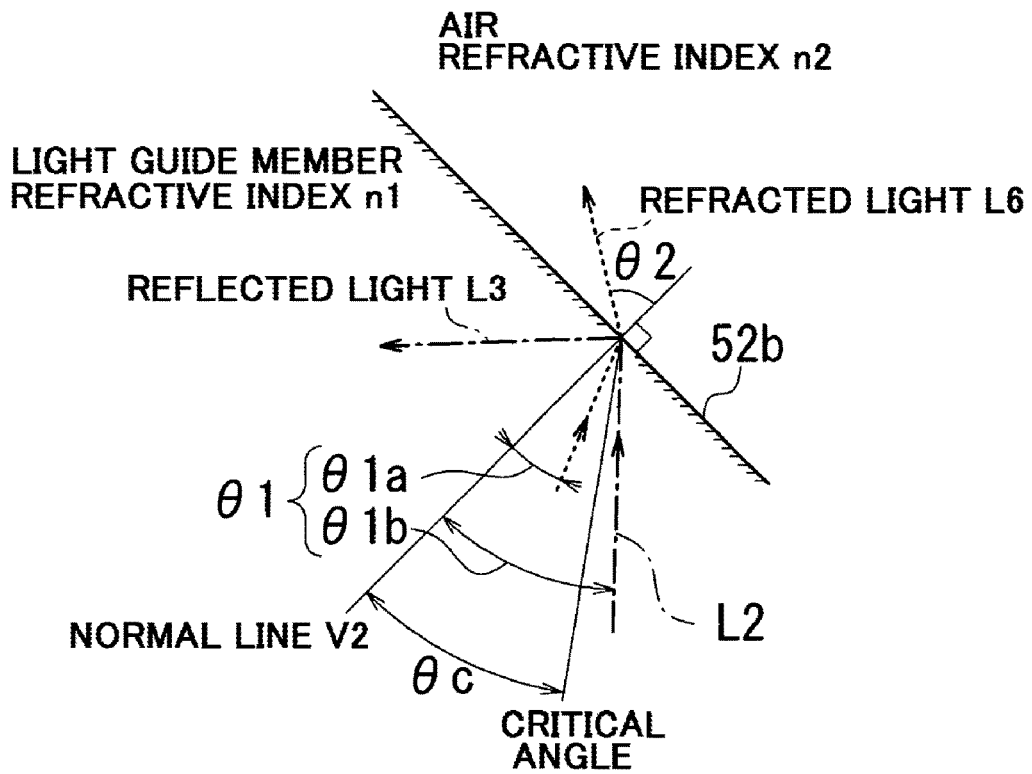
FIGS. 6(a) to 6(c) describe refraction and reflection of the light on the boundary surface between the light guide member and the air.
Figure 6B:
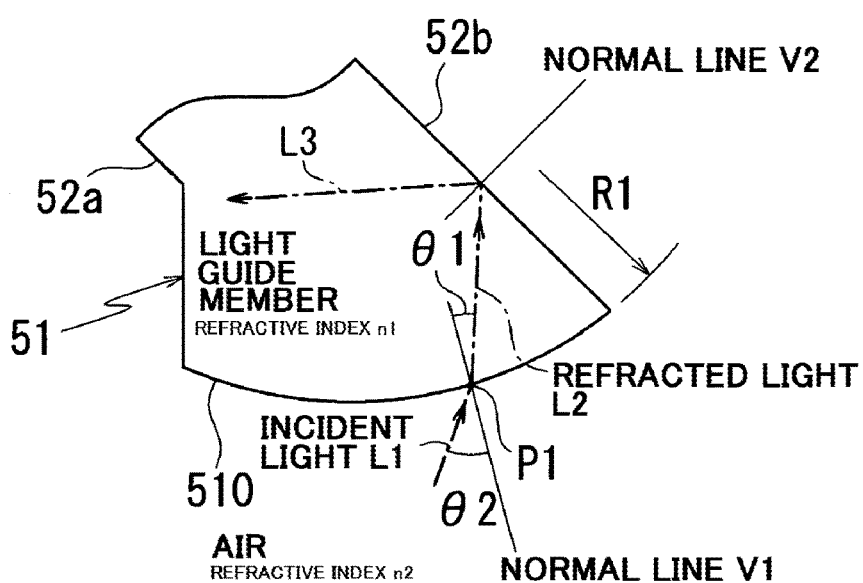
Figure 6C:
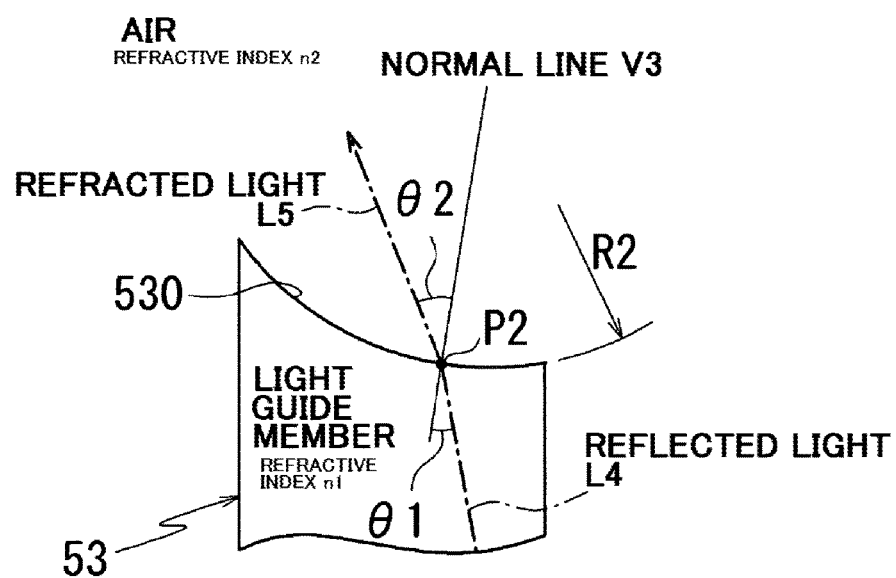

FIGS. 6(a) to 6(c) describe reflection and refraction of the light by the light guide member 50, FIG. 6(a) is a view describing the reflection and refraction of the light by a reflection surface 52b by using a relationship between a critical angle θc and an incident angle θ1, FIG. 6(b) is a view describing the refraction of the light by an incident surface 510, and FIG. 6(c) is a view describing the refraction of the light by an emitting surface 530.

Figure 7A:
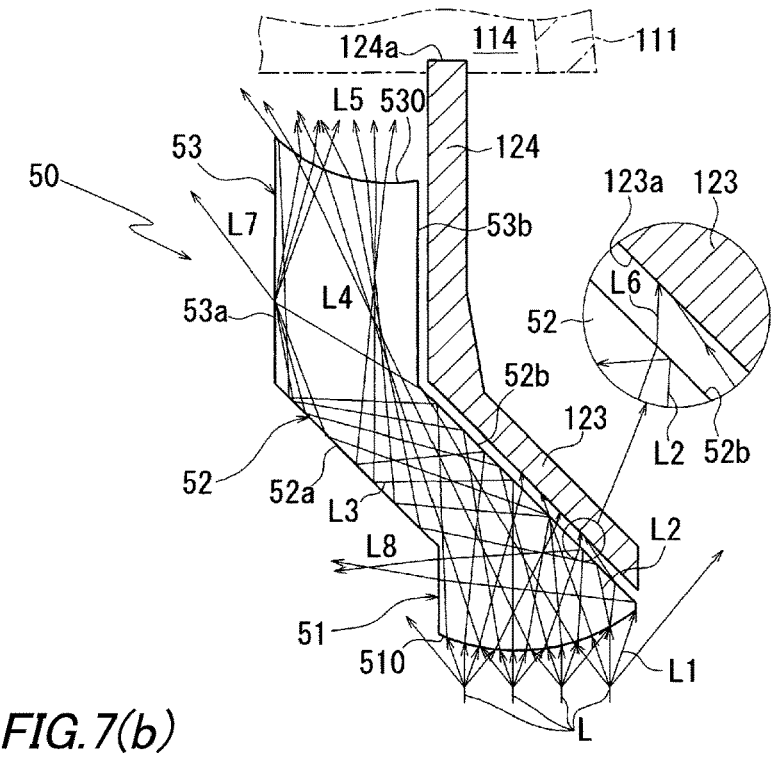
FIGS. 7(a) and 7(b) describe the movement track of the light incident on the light guide member.
Figure 7B:
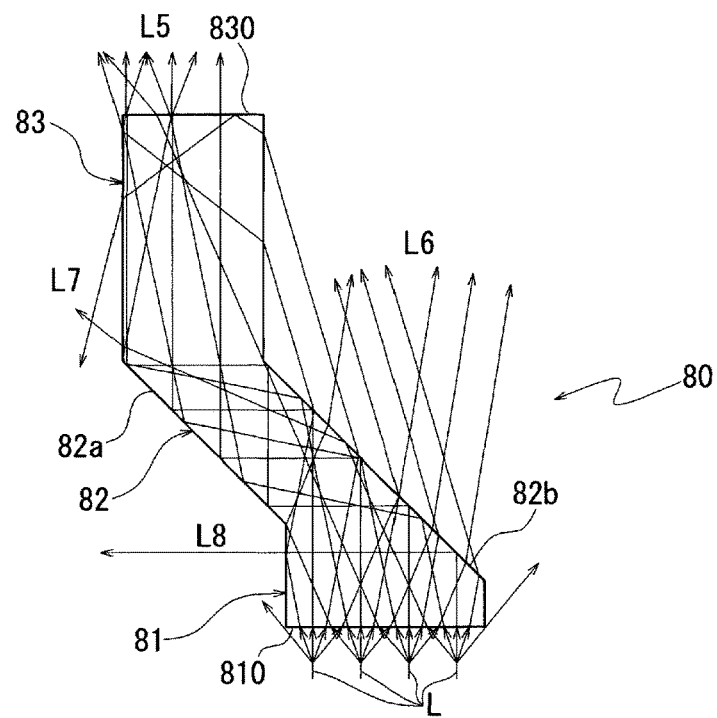

FIGS. 7(a) and 7(b) is a view describing the movement track of the light incident on the inside of the light guide member 50, FIG. 7(a) is a view illustrating a case of the light guide member 50 according to the embodiment, and FIG. 7(b) is a view illustrating a case of a light guide member 80 (prism) according to a related art in which the incident surface and the emitting surface are respectively flat surfaces. In addition, in FIG. 7(a), the light guide member 50 is illustrated together with the light shielding wall portion 123 and the inhibition wall portion 124 in which the light guide member 50 is fixed to the inner side surface, and for convenience of the description, the light guide member 50, the light shielding wall portion 123, and the inhibition wall portion 124 are illustrated having a void.

The light guide member 50 is provided for guiding the light emitted from the light source L to a keytop 110 of the keybutton 11, and is formed of a material having a refractive index n1 which is higher than a refractive index n2 (=1.0003) of the air (n1>n2).

Examples of the material include optical glass (refractive index: 1.497), polycarbonate (refractive index: 1.59), or optical plastic (refractive index: 1.5 to 1.57), such as poly methyl methacrylate resin.

As illustrated in FIG. 4, the light guide member 50 integrally includes the incident portion 51 on which the light from the light source L is incident, a guide portion 52 which guides most of the light incident from the incident portion 51 to an emitting portion 53 while reflecting the light, and the emitting portion 53 which radiates the light that has reached the emitting portion 53 through the guide portion 52 toward the keytop 110.

The incident portion 51 is provided to oppose the light source L in the axial direction of an axial line X1 parallel to the axial line X (refer to FIG. 2), and a surface (incident surface 510) that opposes the light source L of the incident portion 51 is formed in a shape of a curved surface that protrudes to the light source L side.

In order to receive the light radiated from the light source L positioned on the outer side of the operation detection portion 15, the incident portion 51 is positioned further on the outer side than the emitting portion 53 in the radial direction of the axial line X1, and is positioned further below the substrate 30 side than the emitting portion 53 in the axial direction of the axial line X1 (refer to FIG. 2).

Here, since the incident portion 51 is formed of a material having the refractive index n1 which is higher than the refractive index n2 of the air, the light which is radiated from the light source L and has reached the incident portion 51 is not reflected by the incident surface 510, and is refracted and enters the inside of the incident portion 51. This is because the critical angle does not exist when the light advances to a medium having a high refractive index from a medium having a low refractive index.

In the embodiment, by forming the incident surface 510 in a shape of a curved surface that protrudes to the light source L side and increasing the surface area of the incident surface 510, possibility that the incident surface 510 comes into contact with the light radiated from the light source L increases, and the quantity of light incident from the incident portion 51 increases.

As illustrated in FIG. 4, the incident surface 510 has a predetermined width W1 in a radial direction of the axial line X1, and one side 510a of the incident surface 510 is connected to a lower end of the reflection surface 52b of the guide portion 52.

The reflection surface 52b is a flat surface inclined at a predetermined angle θy with respect to a normal line Y1 of the axial line X1, and the reflection surface 52b is connected to a side surface portion 53b of the emitting portion 53 further on the axial line X1 side than the other side 510b of the incident surface 510 intersecting the upper side of the incident surface 510 in the radial direction of the axial line X1.

Therefore, on the upper side of the incident portion 51, the reflection surface 52b is positioned, and substantially the entire light from the light source L incident from the incident surface 510 reaches the reflection surface 52b of the guide portion 52.

The guide portion 52 is provided for guiding the light incident on the incident portion 51 to the emitting portion 53, and includes a reflection surface 52a and the reflection surface 52b which are inclined at the predetermined angle θy with respect to the normal line Y1 of the axial line X1.

The reflection surfaces 52a and 52b are provided in a positional relationship in which both of the reflection surfaces 52a and 52b are parallel to each other, and in the embodiment, the reflection surface 52a is positioned on the lower side on the substrate 30 side and the reflection surface 52b is positioned on the upper side on the keybutton 11 side.

The guide portion 52 has a predetermined thickness W3 in a direction orthogonal to the reflection surfaces 52a and 52b, and the thickness W3 of the guide portion 52 is set to be a thickness by which the light incident on the inside of the light guide member 50 from the incident portion 51 moves toward the emitting portion 53 after being reflected by the reflection surface 52b and the reflection surface 52a.

In the embodiment, in accordance with an intersection angle (predetermined angle θy, (θy≥θc)) with respect to the normal line Y1 of the axial line X1 of the reflection surfaces 52a and 52b, a radius of curvature R1 (refer to FIG. 6(b)) of the above-described incident surface 510 is set such that most of the incident angle with respect to the reflection surface 52b of the light (refracted light) which is incident from the incident surface 510 and has reached the reflection surface 52b becomes equal to or greater than the critical angle θc.

Here, as illustrated in FIG. 6(a), the critical angle θc is the minimum incident angle (an angle which considers a normal line V2 of the reflection surface 52b as a reference) at which the incident light can be totally reflected by the reflection surface 52b.

For example, in a case where the light which advances into the light guide member 50 having the refractive index n1 has reached a boundary surface (reflection surface 52b) between the light guide member 50 and the air having the refractive index n2, a relationship based on the Snell's law of an incident angle θ1 and a refraction angle θ2 of the light with respect to the reflection surface 52b becomes the following equation (1).

[Equation (1)]

$$n2/n1 = \sin\theta1/\sin\theta2 \quad (1)$$

In addition, the minimum incident angle (critical angle θc: θ1 when θ2 becomes 90°, an angle which considers the normal line V2 of the reflection surface 52b as a reference) when the light that has reached the reflection surface 52b is totally reflected by the reflection surface 52b becomes the following equation (2).

[Equation (2)]

$$\text{Critical angle } \theta c = \arcsin(n2/n1) \quad (2)$$

Therefore, in the embodiment, based on the refractive index n1 of the light guide member 50 and the refractive index n2 of the air, the critical angle θc on the reflection surface 52b is calculated from the above-described equation (2), and the radius of curvature R1 of the incident surface 510 is set such that the incident angle θ1 of most of the light (refracted light L2) which is refracted by the incident surface 510 and has reached the reflection surface 52b becomes equal to or greater than the critical angle θc.

Here, the setting of the radius of curvature of the incident surface 510 will be described.

As described above, since the incident portion 51 is formed of a material having the refractive index n1 which is higher than the refractive index n2 of the air, after being refracted at the incident angle θ2 with respect to the incident surface 510 and the refraction angle θ1 determined in accordance with the refractive indexes n1 and n2, the light (FIG. 6(b), incident light L1) which is radiated from the light source L and has reached the incident surface 510 advances toward the reflection surface 52b in the incident portion 51.

Therefore, in the embodiment, as illustrated in FIG. 6(b), at each of incident points P1 of the light on the incident surface 510, the incident angle θ2 and the refraction angle θ1 of the light at the incident point P1 necessary for increasing the incident angle with respect to the reflection surface 52b of the light (refracted light L2) refracted at the incident point P1 to be greater than the critical angle θc, are calculated based on the position of the light source L and the intersection angle θy with respect to the normal line Y1 of the axial line X1 of the reflection surface 52b.

In addition, by acquiring a normal line V1 which realizes the calculated incident angle θ2 and the refraction angle θ1 at each of the incident points P1, and by linking segments having a narrow width of a tangent line orthogonal to the normal line V1 at each of the incident points P1 are linked to each other in a direction along a virtual line Lm which extends in the radial direction of the axial line X1 and in a direction (a direction orthogonal to a paper surface in FIG. 6(b)) orthogonal to both of the axial line X1 and the virtual line Lm, and accordingly, a three-dimensional shape of the incident surface 510 which can reflect substantially the entire light refracted by the incident surface 510 by the reflection surface 52b, and the radius of curvature R1 are set.

Accordingly, as illustrated in FIG. 6(a), since most of the light (refracted light L2) which is refracted by the incident surface 510 and of which the advancing direction is changed to the direction toward the reflection surface 52b, is incident on the reflection surface 52b at an incident angle θ1b (θ1b≥θc) which is greater than the critical angle θc, most of the light (refracted light L2) refracted by the incident surface 510 is totally reflected on the reflection surface 52a side without being refracted by the reflection surface 52b.

Incidentally, a part of the light (refracted light L2) refracted by the incident surface 510 is refracted on the reflection surface 52b at an incident angle θ1a (θ1a≤θc) which is smaller than the critical angle θc, and leaks out to the outside of the light guide member 50 (refracted light L6 in FIGS. 4 and 6(a)).

Since the reflection surface 52a is provided to be parallel to the reflection surface 52b, light (reflected light L3) which is reflected by the reflection surface 52b and of which the advancing direction is changed to the direction toward the reflection surface 52a, is incident on the reflection surface 52a at the incident angle θ1b which is the same as that when the light is totally reflected by the reflection surface 52b (reflected light L3 in FIGS. 4 and 6(a)).

Accordingly, the entire light which is reflected by the reflection surface 52b and has reached the reflection surface 52a does not leak out from the reflection surface 52a, and is totally reflected by the reflection surface 52a, and the advancing direction is changed to the direction toward the emitting portion 53 (reflected light L4 in FIG. 4 and reflected light L4c in FIG. 5).

The emitting portion 53 extends in the direction of separating from the incident portion 51 along the axial line X1, and side surface portions 53a and 53b which are parallel to each other in the emitting portion 53 are provided to be parallel to the axial line X1.

The emitting portion 53 has a predetermined width W2 in the radial direction of the axial line X1, and the upper end surface becomes the emitting surface 530 which is concaved in a shape of a curved surface in the direction of being away from the keybutton 11.

A lower end 53a1 of the side surface portion 53a is connected to the reflection surface 52a of the above-described guide portion 52, the side surface portion 53a and the reflection surface 52a intersect with each other at the predetermined angle θy considering the normal line (which is the same as the normal line Y1 of the axial line X1) of the side surface portion 53a as a reference.

Here, the side surface portion 53a is positioned on the moving direction side of the light (reflected light L4) reflected by the reflection surface 52a, and a part of the light (reflected light L4c) reflected by the reflection surface 52a reaches the side surface portion 53a.

In the embodiment, an intersection angle θx with respect to the axial line X1 of the reflection surface 52a is set such that the intersection angle θy between the normal line Y1 of the side surface portion 53a and the reflection surface 52a becomes equal to or greater than the above-described critical angle θc (θy≥θc).

Here, as illustrated in FIG. 5, the light is incident while an incident angle θz in the side surface portion 53a of the reflected light L4c which is reflected by the reflection surface 52a and has reached the side surface portion 53a is the incident angle θz which is necessarily greater than the intersection angle θy between the reflection surface 52a and the normal line Y1 of the side surface portion 53a.

Therefore, when the intersection angle θy between the reflection surface 52a and the normal line Y1 of the side surface portion 53a is equal to or greater than the critical angle θc, since the incident angle θz of the light (reflected light L4c) which is reflected by the reflection surface 52a and has reached the side surface portion 53a becomes the incident angle which is greater than the critical angle θc in the side surface portion 53a, in the embodiment, the entire light (reflected light L4c) that has reached the side surface portion 53a is totally reflected by the side surface portion 53a, and the advancing direction is changed to the direction toward the emitting surface 530.

In addition, there is case where (1) the light reflected by the side surface portion 53a and (2) the light reflected by the reflection surface 52a reach the side surface portion 53b on the opposite side.

Here, when investigating the case of the above-described (1), on the side surface portion 53a, since the light which is incident at the critical angle θc or greater is reflected by the side surface portion 53a, and the side surface portion 53a and the side surface portion 53b are provided to be parallel to each other, the entire incident angle with respect to the side surface portion 53b of the light which is reflected by the side surface portion 53a and has reached the side surface portion 53b becomes equal to or greater than the critical angle θc. Accordingly, the entire light which is reflected by the side surface portion 53a and has reached the side surface portion 53b is totally reflected by the side surface portion 53b.

In the light guide member 50 according to the embodiment, a length of the side surface portion 53b becomes shorter than a length of the side surface portion 53a, and the light (reflected light L4c) reflected by the side surface portion 53a is not incident on the side surface portion 53b.

When investigating the case of the above-described (2), as illustrated in FIG. 5, an incident angle φ with respect to the side surface portion 53b of the light which is reflected by the reflection surface 52a and has reached the side surface portion 53b becomes φ≥2α (the maximum φ=90°), and φ>α is established. Here, α is an incident angle with respect to the normal line V2 of the reflection surface 52a of the light that has reached the side surface portion 53b.

Since the light incident on the reflection surface 52a is the reflected light reflected by the reflection surface 52b, the incident angle α with respect to the normal line V2 of the reflection surface 52a of the reflected light L3 is equal to or greater than the critical angle θc (α≥θc).

By doing so, α>α≥θc is achieved, and the light which is reflected by the reflection surface 52a and is incident on the side surface portion 53b is also totally reflected by the side surface portion 53b.

In this manner, in a case where the light which advancing the inside of the light guide member 50 has reached the side surface portion 53b, the entire light that has reached the side surface portion 53b is totally reflected by the side surface portion 53b and is guided to the emitting surface 530 side, and in the light guide member 50, the light which is oriented toward the outside of the light guide member 50 from the side surface portion 53b does not leak out.

In the light guide member 50 of the embodiment, the reflected light L4 reflected by the reflection surface 52a, the reflected light L4c reflected by the side surface portions 53a and 53b, refracted light L2b incident from the incident surface 510, light (refer to FIG. 5) reflected by a reflection angle φ from the side surface portion 53b advances in the emitting portion 53 and reaches the emitting surface 530.

As described above, since the light guide member 50 is formed of a material having the refractive index n1 which is higher than the refractive index n2 of the air, the light that has moved in the emitting portion 53 and has reached the emitting surface 530, is refracted or reflected by the emitting surface 530 in accordance with the incident angle with respect to the emitting surface 530.

In the embodiment, in order to allow most of the light that has reached the emitting surface 530 to be refracted by the emitting surface 530 and the advancing direction to become the direction toward the keytop 110, the shape in which the incident angle on the emitting surface 530 becomes equal to or less than the critical angle θc, and a radius of curvature R2 are set.

Specifically, as illustrated in FIG. 6(c), at each of incident points P2 of the light on the emitting surface 530, the incident angle θ1 becomes smaller than the critical angle θc, and a normal line V3 which satisfies a condition of being identical to the direction in which the refraction angle θ2 desires to refract the light is determined, and thus, the segments having a narrow width of a tangent line orthogonal to the normal line V3 at each of the incident points P2 are linked to each other in a direction along the virtual line Lm which extends in the radial direction of the axial line X1 and in a direction (a direction orthogonal to a paper surface in FIG. 6(c)) orthogonal to both of the axial line X1 and the virtual line Lm, and accordingly, a three-dimensional shape of the emitting surface 530 which can refract the light that has reached the emitting surface 530 in a desirable direction (for example, the direction of illuminating the desirable position of the keytop 110), and the radius of curvature R2 of the emitting surface 530 are set.

As illustrated in FIG. 2, the emitting surface 530 of the emitting portion 53 in the housing 12 is positioned in an opening 121a which is in contact with the outer circumference of the support portion 122 and is open.

The opening 121a is open at a position that opposes the space portion 114 of the keybutton 11 which is a position hidden by the keybutton 11 when viewed from above.

At the circumferential edge of the opening 121a, the inhibition wall portion 124 which inhibits the light that passes through the opening 121a from diffusing to the outer side in the radial direction of the axial line X, is provided. As illustrated in FIG. 7(a), the inhibition wall portion 124 extends in the upward-and-downward direction along the side surface portion 53b of the emitting portion 53, and an upper end 124a of the inhibition wall portion 124 is a further upper part on the keybutton 11 side than the emitting surface 530, and when the keybutton 11 is not operated, the upper end 124a is formed to have a length that reaches the inner side of the circumferential wall portion 111 of the keybutton 11.

Therefore, since the movement of the light to the side (outer side in the radial direction of the axial line X) released to the outside from the emitting surface 530 of the light guide member 50 is inhibited by the inhibition wall portion 124, the light is appropriately prevented from leaking out from a void between the housing 12 and the keybutton 11.

At a lower part of the inhibition wall portion 124, the light shielding wall portion 123 is provided being integrated therewith. The light shielding wall portion 123 extends to a lower part on the incident portion 51 side along the reflection surface 52b of the guide portion 52, and has a width Wa (refer to FIG. 1(b)) that covers the reflection surface 52b across the entire surface.

The light shielding wall portion 123 is formed of a material that does not transmit the light (refracted light L6) which leaks out to the outside of the guide portion 52 from the reflection surface 52b.

This is for preventing generation of a related situation since the periphery of the housing 12 is illuminated due to the leaked-out light when the light which has leaked out from the reflection surface 52b leaks out to the outside of the housing 12 (refer to FIG. 2).

Hereinafter, the movement track of the light incident on the light guide member 50 will be described using a case where there are four light sources L as an example.

As illustrated in FIG. 7(a), since the refractive index n1 of the material that configures the incident portion 51 is greater than the refractive index n2 of the air, the light from the light source L that has reached the incident surface 510 is not reflected by the incident surface 510, and enters the inside of the incident portion 51 as the refracted light L2.

The reflection surface 52b is positioned on the upper side of the incident portion 51, and the incident surface 510 having a shape of a curved surface of the incident portion 51 is formed to have a radius of curvature by which the light that has reached the incident surface 510 is refracted and the advancing direction is changed to the direction toward the reflection surface 52b, and thus, most of the light from the light source L incident from the incident portion 51 reaches the reflection surface 52b.

Here, in the light that has reached the reflection surface 52b, the light in which the incident angle θ1 with respect to the reflection surface 52b is greater than the critical angle θc is reflected by the reflection surface 52b, and the advancing direction is changed to the direction toward the reflection surface 52a (reflected light L3).

Meanwhile, the light in which the incident angle θ1 with respect to the reflection surface 52b is smaller than the critical angle θc is refracted by the reflection surface 52b, and leaks out to the outside of the light guide member 50 (refracted light L6).

Here, on the upper side (outer side) of the reflection surface 52b, the light shielding wall portion 123 is provided, and thus, the light that leaks out to the outside of the light guide member 50 from the reflection surface 52b is prevented from being transmitted by the light shielding wall portion 123. Accordingly, there is not a case where the light that leaks out from the reflection surface 52b leaks out to the outside of the housing 12 (refer to FIG. 2), and the periphery of the housing 12 is unintentionally illuminated.

The light (reflected light L3) which is reflected by the reflection surface 52b and in which the advancing direction is changed to the direction toward the reflection surface 52a is incident on the reflection surface 52a at the incident angle θ1b which is the same as the incident angle θ1b with respect to the reflection surface 52b since the reflection surface 52a and the reflection surface 52b are positioned to be parallel to each other (refer to FIG. 4).

Since the incident angle θ1b is an angle which is greater than the critical angle θc, the light that has reached the reflection surface 52a is totally reflected on the reflection surface 52a, and the advancing direction is changed to the direction toward the emitting portion 53 (reflected light L4).

In addition, a part (reflected light L4c) of the light (reflected light L4) reflected by the reflection surface 52a reaches the side surface portion 53a of the emitting portion 53. As described above, the intersection angle θy (refer to FIGS. 4 and 5) between the reflection surface 52a and the normal line Y1 of the axial line X1 is set to be equal to or greater than the critical angle θc in the side surface portion 53a, and the incident angle θz to the side surface portion 53a of the light (reflected light L4c) reflected by the reflection surface 52a is greater than the critical angle θc, and thus, the light that has reached the side surface portion 53a is totally reflected by the side surface portion 53a, and the advancing direction is changed to the direction toward the emitting surface 530 (θz>θy≥θc).

Therefore, the light (refracted light L7) which is refracted by the side surface portion 53a of the emitting portion 53 and leaks out to the outside becomes an extremely small part of the light that has reached the side surface portion 53a after being reflected by the reflection surface 52b (refer to FIG. 7(a)).

The light (reflected light L4) reflected by the reflection surface 52a, the light (reflected light L4c) reflected by the side surface portion 53a, the light (refracted light L2b) incident from the incident surface 510, and the light (refer to FIG. 5) reflected at the reflection angle ϕ from the side surface portion 53b finally reach the emitting surface 530.

Since the shape of the emitting surface 530 is set such that the advancing direction of the light refracted by the emitting surface 530 is oriented toward a desirable position of the keytop 110, refracted light L5 emitted from the emitting surface 530 illuminates the desirable position of the keytop 110.

Meanwhile, as illustrated in FIG. 7(b), in a case of the light guide member 80 (prism) according to the related art in which an incident surface 810 is a flat surface, the incident surface 510 does not have a shape of a curved surface that protrudes to the light source L side. Therefore, after being refracted by the incident surface 810 and entering the inside of the light guide member 80, most of the light having an incident angle with respect to a reflection surface 82b which is smaller than the critical angle θc is included in the light that has reached the reflection surface 82b, and thus, more quantity of the light than that in a case of the above-described light guide member 50 is refracted by the reflection surface 82b and leaks out to the outside of the light guide member 80 (refracted light L6 in FIG. 7(B)).

Therefore, since the quantity of light which is reflected by the reflection surface 82b and is guided to an emitting portion 83 side is smaller than that in a case of the above-described light guide member 50, the quantity of light that illuminates the keytop 110 becomes small.

Furthermore, in a case of the light guide member 80, since a light shielding member which covers the reflection surface 82b of a guide portion 82 is not provided, the light which is refracted by the reflection surface 82b and leaks out to the outside of the light guide member 80 leaks out to the outside of the housing without being shielded, and thus, a part which is not planned around the keybutton 11 is illuminated.

In addition, an emitting surface 830 of the light guide member 80 becomes a flat surface, and unlike the emitting surface 530 of the above-described light guide member 50, there is not a case where the advancing direction of the light (refracted light L5) refracted by the emitting surface 530 is adjusted to the direction of illuminating the desirable position of the keytop 110.

Therefore, the light emitted from the emitting surface 830 cannot be sufficiently used in illuminating the keytop 110, the quantity of light that illuminates the desirable part (for example, printed part) of the keytop 110 becomes small, and as a result, the visibility of character information or the like printed on the keytop 110 is not sufficiently improved.

As described above, in the embodiment, (1) there is provided a keyboard which includes the housing 12 which supports the keybutton 11 to be capable of reciprocating in the operating direction of the keybutton 11, and the substrate 30 on which the operation detection portion 15 of the keybutton 11 is provided, and in which the keybutton 11 supported by the housing 12 is disposed to oppose the operation detection portion 15 on the axial line X along the operating direction of the keybutton 11, in which the light source L is provided further on the outer side than the operation detection portion 15 on the substrate 30 when viewed from the axial direction of the axial line X, the light guide member 50 which guides light from the light source L to the keytop 110 of the keybutton 11 is formed of a material having a refractive index which is higher than that of the air and is provided in the housing 12, the light guide member 50 includes the incident portion 51 disposed to oppose the light source L in the axial direction of the axial line X, the emitting portion 53 disposed to oppose the keytop 110 at a position hidden by the keybutton 11 when viewed from the axial direction of the axial line X, and the guide portion 52 which guides the light from the light source L incident from the incident portion 51 to the emitting portion 53 while reflecting the light, and the incident surface 510 which is a surface that opposes the light source L of the incident portion 51 is formed in a shape of a curved surface that protrudes to the light source L side.

According to the configuration, since the refractive index n1 of the light guide member 50 is higher than the refractive index n2 of the air, the light which is radiated from the light source L and has reached the incident portion 51 is refracted without being reflected by the incident surface 510 of the front surface of the incident portion 51, and enters the inside of the light guide member 50 from the incident portion 51. The incident surface 510 which is a surface that opposes the light source L of the incident portion 51 is formed in a shape of a curved surface that protrudes to the light source L side, and when the surface area of the incident surface 510 increases, a possibility that the light from the light source L reaches the incident surface 510 increases, the quantity of light (refracted light L2) incident from the incident portion 51 increases, and as a result, it is possible to ensure the quantity of light (refracted light L5) radiated toward to the keytop 110 from the emitting portion 53.

Accordingly, since it is possible to prevent a case where the quantity of light that illuminates the keytop 110 is not sufficient and visibility is not sufficient, it is possible to provide a keyboard which can be used even at a dark place and has excellent visibility.

(2) The guide portion 52 of the light guide member 50 has the reflection surface 52b (first boundary surface) which the light (refracted light L2) which is refracted by the incident surface 510 and is incident on the incident portion 51 reaches, and the incident surface 510 is formed to have the radius of curvature R1 by which the light is capable of entering the reflection surface 52b at an incident angle with respect to the reflection surface 52b of the light refracted by the incident surface 510 which is greater than the critical angle θc (the minimum angle considering the normal line V2 of the reflection surface 52b when the light that has reached the reflection surface 52b is totally reflected, as a reference) of the light on the reflection surface 52b determined in accordance with the refractive index n1 of the light guide member 50 and the refractive index n2 of the air.

For example, in a case where a material of which the refractive index is 1.4 to 1.6 is used as the light guide member 50, the critical angle is 45.60° to 38.70°, and thus, the radius of curvature R1 of the incident surface 510 in this case becomes, for example, 2.6 mm to 2.8 mm.

According to the configuration, it is possible to reflect substantially the entire light (refracted light L2) that has reached the reflection surface 52b by the reflection surface 52b, it is possible to decrease the quantity of light which is refracted by the reflection surface 52b and leaks out to the outside of the light guide member 50, and it is possible to increase the quantity of light that reaches the emitting surface 530.

Accordingly, the quantity of light radiated toward the keytop 110 from the emitting surface 530 increases, and it becomes possible to improve an illumination efficiency of the keytop 110, and to improve visibility.

(3) The incident portion 51 and the emitting portion 53 are disposed at a position offset in the axial direction of the axial line X, and the emitting portion 53 is positioned further on the axial line X side than the incident portion 51 in the radial direction of the axial line X, and in the guide portion 52 of the light guide member 50, the reflection surface 52b (first boundary surface) and the reflection surface 52a (second boundary surface) which reflects the light (reflected light L3) reflected by the reflection surface 52b toward the emitting portion 53 are provided to be parallel to each other, and the intersection angle θy between the reflection surface 52a which is positioned on the incident portion 51 side, that is, further on the axial line X side than the reflection surface 52b and the normal line Y1 of the side surface portion 53a of the emitting portion 53 linked to the reflection surface 52a is set to be equal to or greater than the critical angle θc of the light in the side surface portion 53a.

According to the configuration, since the reflection surface 52a is provided to be parallel to the reflection surface 52b, the light (reflected light L3) which is reflected by the reflection surface 52b and in which the advancing direction is changed to the direction toward the reflection surface 52a is incident on the reflection surface 52a at the incident angle θ1b which is the same as that when the light is totally reflected by the reflection surface 52b (reflected light L3 in FIGS. 4 and 6(a)).

Accordingly, the entire light which is reflected by the reflection surface 52b and has reached the reflection surface 52a does not leak to the outside as the refracted light by the reflection surface 52a, and is totally reflected by the reflection surface 52a, the advancing direction is changed to the direction toward the emitting portion 53 (reflected light L4 in FIG. 4, reflected light L4c in FIG. 5, and reflected light having the incident angle φ in the side surface portion 53b in FIG. 5), and thus, the light from the reflection surface 52a of the guide portion 52 is reliably inhibited from leaking out, and the quantity of light toward the emitting portion 53 can be ensured.

Furthermore, since the reflected light L4c which is reflected by the reflection surface 52a and reaches the side surface portion 53a is incident at the incident angle θz which is necessarily greater than the intersection angle θy between the reflection surface 52a and the normal line Y1 of the side surface portion 53a, when the intersection angle θy between the reflection surface 52a, the side surface portion 53a, and the normal line Y1 of the axial line X1 is equal to or greater than the critical angle θc, the incident angle θz of the light (reflected light L4c) which is reflected by the reflection surface 52a and has reached the side surface portion 53a becomes the incident angle which is greater than the critical angle θc in the side surface portion 53a.

Accordingly, the entire light (reflected light L4c) that has reached the side surface portion 53a is totally reflected by the side surface portion 53a, the advancing direction is changed to the direction toward the emitting surface 530, and thus, it is possible to suppress the leakage of the light from the side surface portion 53a of the emitting portion 53, and to increase the quantity of light which is radiated toward the keytop 110 from the emitting surface 530.

Accordingly, since it is possible to suppress the leakage of the light from the part other than the emitting surface 530 of the light guide member 50, and to increase the entire quantity of light emitted from the emitting surface 530, it is possible to improve an illumination efficiency of the keytop 110, and to improve visibility.

In addition, the reflection surface 52a and the reflection surface 52b are disposed to be parallel to each other, the guide portion 52 is configured of a so-called rhomboid prism, the light incident from the incident portion 51 can move horizontally to a position (a position which corresponds to the emitting portion 53) that is appropriate for illuminating the keytop 110, and thus, the light from the light source L disposed on the outer side of the operation detection portion 15 can be radiated toward the keytop 110 from the lower part of the keybutton 11 positioned above the operation detection portion 15.

Accordingly, without increasing the size of the housing 12 which supports the keybutton 11 to be large, it is possible to appropriately illuminate the keytop 110.

In addition, while the light is reflected at least one or more times between the reflection surfaces 52a and 52b which are parallel to each other, it is possible to guide the light to the emitting portion 53 positioned on the inner side from the incident portion 51 positioned on the outer side in the radial direction of the axial line X, and thus, it is possible to appropriately illuminate the keytop 110 without changing the shape of the housing 12 to be large, and changing the disposition of the operation detection portion 15.

Furthermore, as the reflection surface 52a and the reflection surface 52b are disposed to be parallel to each other, the quantity of light which is totally reflected increases, and thus, it is possible to achieve optical transfer efficiency.

(4) The light shielding wall portion 123 (light shielding portion) which shields the light which is refracted by the reflection surface 52b and leaks to the outside of the light guide member 50 is provided on the reflection surface 52b.

According to the configuration, since the light which is refracted by the reflection surface 52b of the guide portion 52 and has leaked out to the outside of the guide portion 52 is inhibited from diffusing by the light shielding wall portion 123, it is possible to prevent the part which is not intended (for example, the side surface or the like of the housing 12) from being illuminated and shining due to the leaked-out light.

When the part which is not intended shines, the quantity of light which illuminates the keytop 110 decreases, visibility of the illuminating keytop deteriorates, and thus, by providing the light shielding wall portion 123, it is possible to appropriately prevent generation of such a situation.

In a case where the light shielding wall portion 123 is not provided, the light which is refracted by the reflection surface 52b and has leaked out dazzles the operator, and thus, it is possible to prevent dazzling of the operator by providing the light shielding wall portion 123.

(5) The emitting surface 530 which opposes the keytop 110 of the emitting portion 53 is formed in a shape of a curved surface that is concaved in a recessed shape in a direction of being away from the keytop 110.

According to the configuration, since it is possible to suppress the reflection and the refraction of the light that has reached the emitting surface 530 on the emitting surface 530, it is possible to guide the light emitted from the emitting surface 530 to a predetermined range of the keytop 110 and to appropriately illuminate the keytop 110, and thus, it is possible to improve an illumination efficiency of the keytop 110, and to improve visibility.

(6) The emitting surface 530 is formed to have the radius of curvature R2 by which the light (the reflected light L4 and L4c and the refracted light L2b) that has reached the emitting surface 530 through the inside of the emitting portion 53 enters the emitting surface 530 at the angle (which is equal to or less than the critical angle θc) at which the light is refracted by the emitting surface 530, and the advancing direction of the refracted light becomes the direction toward a desirable range of the keytop.

In a case where the above-described material of which the refractive index is 1.4 to 1.6 is used as the light guide member 50, the radius of curvature R2 of the emitting surface 530 according to the embodiment is set to be, for example, 2.2 mm to 3.0 mm.

According to the configuration, it is possible to guide the light that has reached the emitting surface 530 to the desirable range of the keytop 110, and to appropriately illuminate the keytop 110.

Accordingly, there is not a case where biased illumination in which the part which is not intended is illuminated and shines is generated.

(7) The housing 12 includes the opening 121a through which the light which is refracted by the emitting surface 530 of the emitting portion 53 and is emitted to the outside of the light guide member 50 passes, and the inhibition wall portion 124 (inhibition wall) which inhibits the light that passes through the opening 121a from diffusing to the outer side in the radial direction of the axial line X is provided at a side edge of the opening 121a, and the inhibition wall portion 124 is inserted into the inner side of the circumferential wall portion 111 of the keybutton 11 when the keybutton 11 is not operated.

According to the configuration, since it is possible to appropriately prevent the light which is emitted from the emitting surface 530 of the emitting portion 53 from leaking out to the outer side in the radial direction of the axial line X from the void between the housing 12 and the circumferential wall portion 111 of the keybutton 11, it is possible to appropriately prevent visibility of the keybutton 11 from deteriorating due to the leaked-out light, or the quantity of light which illuminates the keybutton 11 from decreasing.

(8) The housing 12 is formed of a transparent resin material.

According to the configuration, it is possible to form the light guide member 50 to be integrated with the housing 12, and to decrease manufacturing costs of the keyboard.

In the above-described embodiment, a case where the light shielding wall portion 123 which is refracted by the reflection surface 52b and shields the light that leaks to the outside of the light guide member 50 is provided in the housing 12, is illustrated as an example, but the light guide member 50 may be formed to be integrated with the housing, and the light shielding wall portion 123 may be omitted.

In this case, by providing a layer made of a material that absorbs the light (refracted light) which is refracted by the reflection surface 52b and leaks out to the outside at the outer circumference of the reflection surface 52b of the guide portion 52, it is possible to appropriately inhibit the light from leaking out to the outside of the housing 12.

Figure 8:
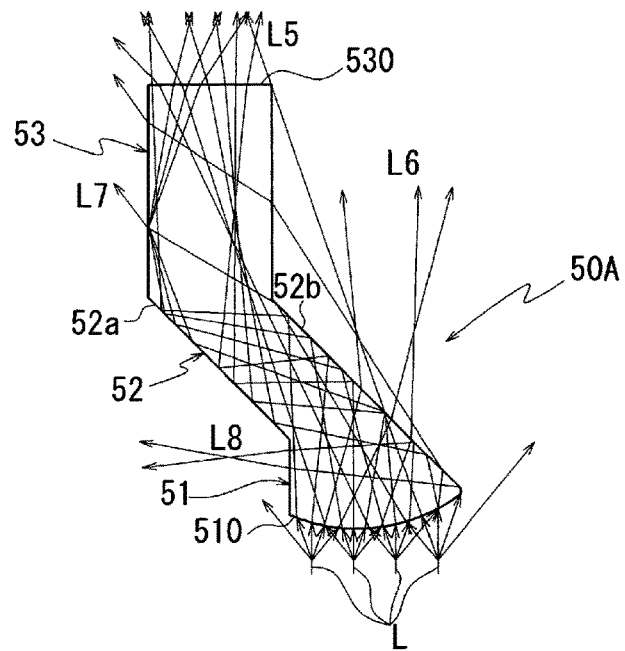
FIG. 8 is a view illustrating a light guide member according to a modification example.
Figure 9:
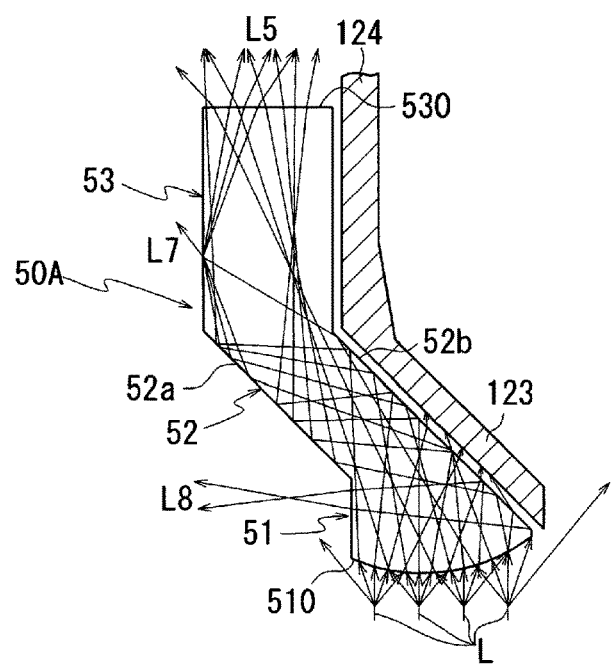
FIG. 9 is a view illustrating a light guide member according to a modification example.

FIGS. 8 and 9 are views describing a light guide member 50A according to a modification example.

In the above-described embodiment, a case of the light guide member 50 in which the incident surface 510 of the incident portion 51 makes a shape of a curved surface that protrudes to the light source L side, and in which the emitting surface 530 of the emitting portion 53 makes a shape of a curved surface which is concaved in a recessed shape in the direction of being away from the keytop 110, is illustrated as an example, but as illustrated in FIGS. 8 and 9, the incident surface 510 of the incident portion 51 may make a shape of a curved surface that protrudes to the light source L side, and the emitting surface 530 of the emitting portion 53 may employ the light guide member 50A which makes a flat surface.

In this case, at least, it is possible to reflect substantially the entire light (refracted light L2) that has reached the reflection surface 52b by the reflection surface 52b, to reduce the quantity of light which is refracted by the reflection surface 52b and leaks out to the outside of the light guide member 50, and to increase the quantity of light that reaches the emitting surface 530, and thus, it is possible to increase the quantity of light radiated toward the keytop 110, to improve an illumination efficiency of the keytop 110, and to improve visibility, compared to the case of the light guide member 80 according to the related art.

In addition, when employing the light guide member 50A, as illustrated in FIG. 9, it is preferable to provide the light shielding wall portion 123 and the inhibition wall portion 124 along the outer circumference of the light guide member 50A.

According to the configuration, it is possible to prevent the light from leaking out to the outside of the light guide member 50A from the reflection surface 52b, and the light radiated from the emitting surface 530 from diffusing.

Accordingly, since the light which is refracted by the reflection surface 52b of the guide portion 52 and has leaked to the outside of the guide portion 52 is inhibited from diffusing by the light shielding wall portion 123, it is possible to prevent a part which is not intended (for example, the side surface or the like of the housing 12) from being illuminated and shining due to the leaked-out light.

In addition, since it is possible to appropriately prevent the light emitted from the emitting surface 530 of the emitting portion 53 from leaking out to the outer side in the radial direction of the axial line X from the void between the housing 12 and the circumferential wall portion 111 of the keybutton 11, it is possible to appropriately prevent the visibility of the keybutton 11 from deteriorating due to the leaked-out light, and the quantity of light which illuminates the keybutton 11 from deteriorating.

Figure 10:
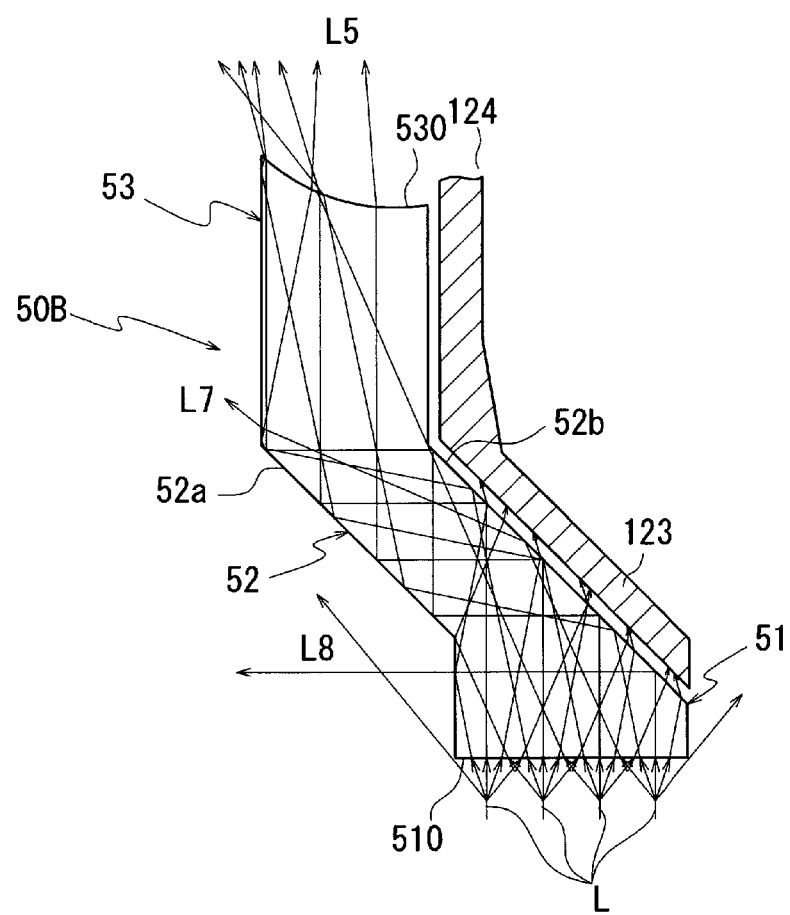
FIG. 10 is a view illustrating a light guide member according to a modification example.

FIG. 10 is a view describing a light guide member 50B according to the other modification example.

Furthermore, the light guide member 50B in which the incident surface 510 of the incident portion 51 is a flat surface and the emitting surface 530 of the emitting portion 53 makes a shape of a curved surface which is concaved in a recessed shape in the direction of being away from the keytop 110, may be employed.

In this case, since it is possible to guide the light emitted from the emitting surface 530 to the predetermined range of the keytop 110 and to appropriately illuminate the keytop 110, at least, it is possible to improve an illumination efficiency of the keytop 110, and to improve visibility.

In this manner, (9) the emitting surface 530 which opposes the keytop 110 of the emitting portion 53 is formed in a shape of a curved surface which is concaved in a recessed shape in the direction of being away from the keytop 110, and is formed to have the radius of curvature R2 by which the light that has reached the emitting surface 530 through the inside of the emitting portion 53 enters the emitting surface 530 at an angle (which is equal to or less than the critical angle θc) at which the light is refracted by the emitting surface 530, and the advancing direction of the refracted light becomes the direction toward the desirable range of the keytop.

According to the configuration, since it is possible to guide the light that has reached the emitting surface 530 to the desirable range of the keytop 110, and to illuminate the keytop 110, even when the quantity of light that has reached the emitting surface 530 is small, it is possible to offset the small amount of light by guiding the light, and thus, it is possible to appropriately prevent visibility of the keytop 110 from deteriorating.

INDUSTRIAL APPLICABILITY

The present invention provides a keyboard which can be used even at a dark place and has excellent visibility since it is possible to prevent a case where the quantity of light which illuminates the keytop is not sufficient and the visibility is not sufficient.

The invention claimed is:

1. A keyboard comprising:
a housing which supports a keybutton to be capable of reciprocating in an operating direction of the keybutton; and
a substrate on which an operation detection portion of the keybutton is provided,
wherein:
the keybutton supported by the housing is disposed to oppose the operation detection portion on an axial line along the operating direction of the keybutton,
a light source is provided further on an outer side than the operation detection portion on the substrate when the light source is viewed from an axial direction of the axial line,
a light guide member which guides light from the light source to a keytop of the keybutton is formed of a material having a refractive index which is higher than a refractive index of the air, and the light guide member is provided in the housing,
the light guide member includes an incident portion disposed to oppose the light source in the axial direction of the axial line, an emitting portion disposed to oppose the keytop at a position hidden by the keybutton when the emitting portion is viewed from the axial direction of the axial line, and a guide portion which guides the light, from the light source, incident from the incident portion to the emitting portion,
the light, from the light source, that is incident from the incident portion reaches a first boundary surface of the guide portion, and
an incident surface of the incident portion which opposes the light source is formed in a shape of a curved surface that protrudes towards the light source and is formed to have a radius of curvature by which the light refracted at the incident surface enters the first boundary surface at an incident angle which is greater than a critical angle of the light on the first boundary surface defined by the refractive index of the light guide member and the refractive index of the air.

2. The keyboard according to claim 1, wherein a second boundary surface which reflects the light reflected at the first boundary surface toward the emitting portion is provided to be parallel to the first boundary surface, in the guide portion, and
wherein an intersection angle between the second boundary surface and a normal line of a side surface portion of the emitting portion that is linked to the second boundary surface is set to be equal to or greater than the critical angle of the light in the side surface portion.

3. The keyboard according to claim 1, wherein a light shielding portion which shields the light which is refracted by the first boundary surface and leaks to an outside of the light guide member is provided on the first boundary surface.

4. The keyboard according to claim 1, wherein an emitting surface of the emitting portion which opposes the keytop is formed in a shape of a curved surface that is concaved in a recessed shape in a direction of being away from the keytop.

5. The keyboard according to claim 4, wherein the emitting surface is formed to have a radius of curvature by which the light that has reached the emitting surface through an inside of the emitting portion is refracted at the emitting surface and an advancing direction of the refracted light is a direction toward the keytop.

6. The keyboard according to claim 1, wherein the housing includes an opening through which the light which is refracted by the emitting portion and is emitted to an outside of the light guide member passes, and
wherein an inhibition wall which inhibits the light that passes through the opening from diffusing to an outer side in a radial direction of the axial line is provided at a side edge of the opening.

7. The keyboard according to claim 1, wherein the housing is formed of a transparent resin material.

8. A keyboard comprising:
a housing which supports a keybutton to be capable of reciprocating in an operating direction of the keybutton; and
a substrate on which an operation detection portion of the keybutton is provided,
wherein:
the keybutton supported by the housing is disposed to oppose the operation detection portion on an axial line along the operating direction of the keybutton,
a light source is provided further on an outer side than the operation detection portion on the substrate when the light source is viewed from an axial direction of the axial line,
a light guide member which guides light from the light source to a keytop of the keybutton is formed of a material having a refractive index which is higher than a refractive index of the air, and the light guide member is provided in the housing,
the light guide member includes an incident portion disposed to oppose the light source in the axial direction of the axial line, an emitting portion disposed to oppose the keytop at a position hidden by the keybutton when the emitting portion is viewed from the axial direction of the axial line, and a guide portion which guides the light, from the light source, incident from the incident portion to the emitting portion, and
an emitting surface of the emitting portion which opposes the keytop is formed in a shape of a curved surface that is concaved in a recessed shape in a direction of being away from the keytop, and is formed to have a radius of curvature by which the light that has reached the emitting surface through an inside of the emitting portion is refracted at the emitting surface and an advancing direction of the refracted light is a direction toward the keytop.

9. The keyboard according to claim 8, wherein the housing includes an opening through which the light which is refracted by the emitting portion and is emitted to an outside of the light guide member passes, and
wherein an inhibition wall which inhibits the light that passes through the opening from diffusing to an outer side in a radial direction of the axial line is provided at a side edge of the opening.

10. The keyboard according to claim 8, wherein the housing is formed of a transparent resin material.

* * * * *